United States Patent
Subramaniyan et al.

(10) Patent No.: US 9,169,782 B2
(45) Date of Patent: Oct. 27, 2015

(54) TURBINE TO OPERATE AT PART-LOAD

(75) Inventors: Moorthi Subramaniyan, Karnataka (IN); Umesh Garg, Karnataka (IN); Joshy John, Karnataka (IN); Lakshmanan Valliappan, Karnataka (IN)

(73) Assignee: General Electric Company, Schenectady, NY (US)

( * ) Notice: Subject to any disclaimer, the term of this patent is extended or adjusted under 35 U.S.C. 154(b) by 845 days.

(21) Appl. No.: 13/343,269

(22) Filed: Jan. 4, 2012

(65) Prior Publication Data

US 2013/0167551 A1 Jul. 4, 2013

(51) Int. Cl.
*F02C 9/18* (2006.01)
*F01D 5/18* (2006.01)
*F01D 9/06* (2006.01)
*F02C 7/14* (2006.01)

(52) U.S. Cl.
CPC . *F02C 9/18* (2013.01); *F01D 5/187* (2013.01); *F01D 9/065* (2013.01); *F02C 7/14* (2013.01)

(58) Field of Classification Search
CPC .......... F01D 5/187; F01D 5/18; F01D 9/065; F01D 9/06; F01D 17/00; F01D 17/04; F01D 9/02; F01D 25/14; F01D 1/02; F02C 9/18; F02C 7/14; F02C 7/18; F02C 3/13
USPC ........ 60/793, 794, 795, 39.24, 782, 784, 785, 60/806
See application file for complete search history.

(56) References Cited

U.S. PATENT DOCUMENTS

| | | | | |
|---|---|---|---|---|
| 4,858,428 A * | 8/1989 | Paul | ............................... | 60/794 |
| 6,385,958 B2 | 5/2002 | Leone et al. | | |
| 6,393,825 B1 | 5/2002 | Leone et al. | | |
| 6,550,253 B2 * | 4/2003 | Mortzheim et al. | ............ | 60/782 |
| 6,644,035 B1 * | 11/2003 | Yamanaka et al. | ............. | 60/806 |
| 8,240,153 B2 * | 8/2012 | Childers et al. | ................. | 60/782 |
| 2001/0018824 A1 | 9/2001 | Leone et al. | | |
| 2009/0056342 A1 | 3/2009 | Kirzhner | | |
| 2010/0154434 A1 * | 6/2010 | Kubota et al. | ................... | 60/785 |
| 2010/0175387 A1 | 7/2010 | Foust et al. | | |
| 2010/0251727 A1 * | 10/2010 | Myers et al. | .................... | 60/795 |
| 2013/0104564 A1 * | 5/2013 | Arar | ............................... | 60/782 |

FOREIGN PATENT DOCUMENTS

| | | |
|---|---|---|
| EP | 1120559 A2 | 8/2001 |
| JP | 2001-207864 A | 8/2001 |
| KR | 2001-0076202 A | 8/2001 |

* cited by examiner

*Primary Examiner* — J. Gregory Pickett
(74) *Attorney, Agent, or Firm* — Ernest G. Cusick; Frank A. Landgraff (57) ABSTRACT

A turbine includes a compressor to intake a fluid and to compress the fluid, a combustion chamber to heat the fluid from the compressor, a turbine section to rotate a shaft with the heated fluid from the combustion chamber, and a bypass circuit to generate a bypass flow by removing a portion of the fluid from the compressor, to heat the bypass flow, and to insert the bypass flow to the turbine section.

20 Claims, 9 Drawing Sheets

TURBINE TO OPERATE AT PART-LOAD

BACKGROUND OF THE INVENTION

The subject matter disclosed herein relates to turbines and particularly to operating a turbine at part-load.

Turbines generally have high efficiency when operating at peak-load and base-load levels. However, when a turbine operates at a part-load to output a power level less than the peak load or the base-load, the turbine loses efficiency since it is operating at off-design conditions.

BRIEF DESCRIPTION OF THE INVENTION

According to one aspect of the invention, a turbine comprises a compressor to intake a fluid; a combustion chamber to heat the fluid from the compressor; a turbine section to rotate a shaft with the heated fluid from the combustion chamber; a bypass circuit to generate a bypass flow by removing a portion of the fluid from the compressor and to transmit the portion of the fluid to the turbine section; and a controller to determine whether a part-load operation is selected, and to open the bypass circuit when the part-load operation is selected. When the controller determines that the part-load operation is selected, the controller determines a normal part-load fluid intake to the compressor, increases the part-load fluid intake to the compressor by a predetermined first percentage above the normal part-load fluid intake, and controls the bypass circuit to remove the portion of the fluid from the compressor such that a percentage of the portion of the fluid removed from the compressor relative to the increased part-load fluid intake is less than or equal to the predetermined first percentage According to another aspect of the invention, a turbine comprises a compressor to intake a fluid and to compress the fluid; a combustion chamber to heat the fluid from the compressor; a turbine section to rotate a shaft with the heated fluid from the combustion chamber; and a bypass circuit to generate a bypass flow by removing a portion of the fluid from the compressor, to heat the bypass flow, and to insert the bypass flow to the turbine section.

According to yet another aspect of the invention, a turbine section of a turbine comprises a casing; a rotor including a shaft and buckets extending radially from the shaft; and nozzles comprising a plurality of airfoils positioned between an outer airfoil support connected to the casing and an inner airfoil support adjacent to the shaft of the rotor. The casing includes a first inlet to receive a purge flow to cool at least the plurality of airfoils and a second inlet to receive a bypass flow to supply the bypass flow to the buckets of the rotor.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
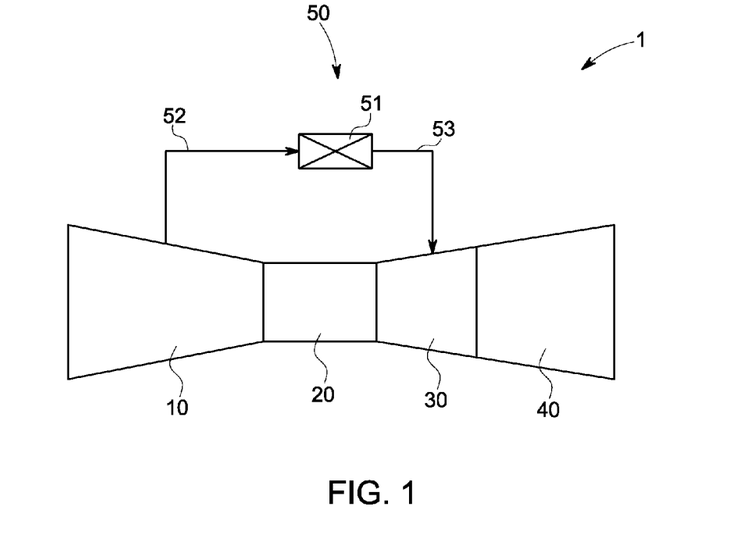
FIG. 1 illustrates a turbine according to one embodiment.
Figure 2:
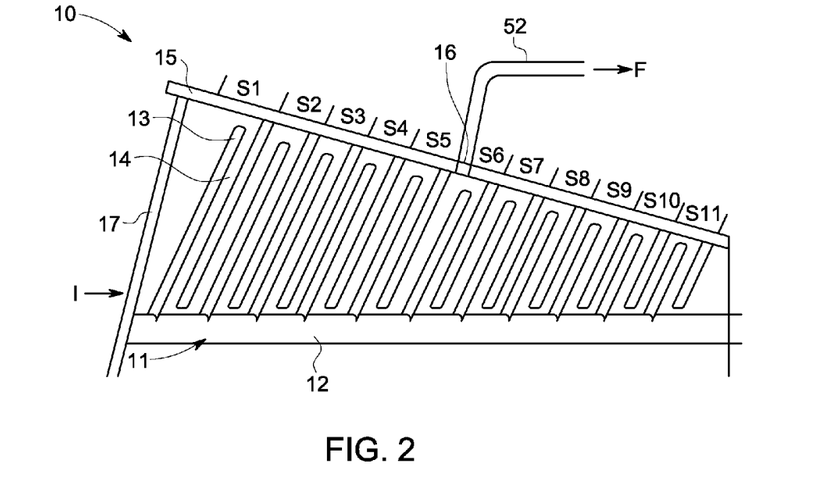
FIG. 2 illustrates a compressor.

FIG. 1 illustrates a turbine 1 according to one embodiment. The turbine 1 includes a compressor 10 to compress a fluid, such as air, water, steam, or another gas. According to the present embodiment, the fluid is air. As illustrated in FIG. 2, the compressor 10 includes a rotor 11 surrounded by a casing 15. The rotor 11 includes a shaft 12 and blades 13 protruding from the shaft 12. Stators, or vanes, 14 protrude from the casing 15. In the present embodiment, air is input to the compressor 10 as illustrated by the reference letter I. A flow of air is regulated by an air intake device 17. In the present embodiment, the air intake device 17 is a fan. According to alternative embodiments, the air intake device 17 includes adjustable nozzles or guide vanes. The air is compressed by accelerating the air with the blades 13 and then by diffusing the air with the vanes 14. The blades 13 surround the shaft 12 in an annular fashion, and the vanes 14 line the inside of the casing 15 in an annular fashion. Each group of a set of blades 13 and a set of vanes 14 immediately downstream from the blades 13 comprises a stage, as indicated by the reference numerals S1-S11.

Although FIG. 2 illustrates a compressor 10 having only eleven stages, alternative embodiments include numbers of stages that vary according to desired design specifications. For example, compressors of different embodiments include between 10 and 20 stages, and according to some embodiments, the stages are divided into low pressure stages and high pressure stages.

Referring again to FIG. 1, the turbine 1 further includes a combustion chamber 20 to heat the air from the compressor 10. According to one embodiment, fuel is supplied to the combustion chamber 20 and ignited as the air passes through the combustion chamber 20.

The turbine 1 further includes a turbine section 30 to convert the energy of the heated air to mechanical work and an exhaust section 40 to expel the air from the turbine 1. It is noted that the term "turbine" is used in the art to describe both an entire device including a compressor, combustion chamber, and turbine section, as well as to describe just the turbine section. In the present specification and claims, the term "turbine section" is used for clarity to describe the portion of the turbine 1 following the combustion chamber 20 to distinguish this portion of the turbine 1 from the description of the entire apparatus.

Figure 3A:
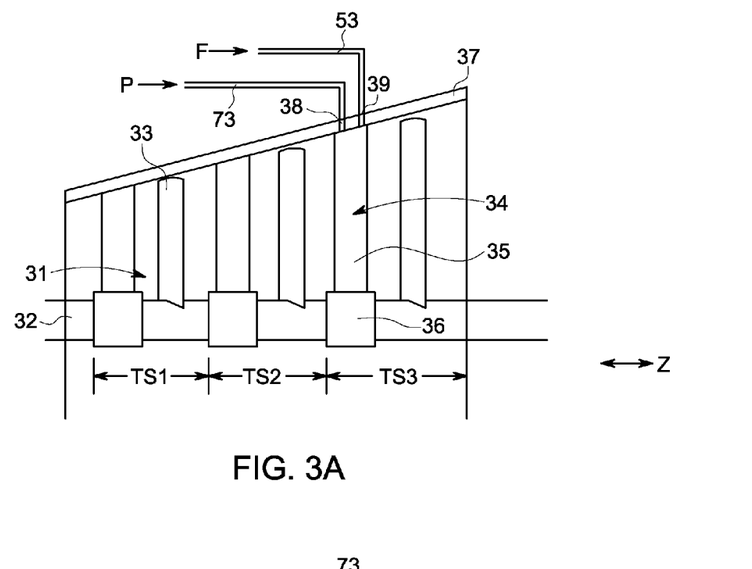
FIGS. 3A to 3C illustrate turbine sections according to disclosed embodiments.

As illustrated in FIG. 3A, the turbine section 30 includes a rotor 31 having a shaft 32 and buckets 33. The buckets 33 rotate about a rotation axis of the shaft 32 when the heated air is exerted on the buckets 33 from the combustion chamber 20, turning the shaft 32. According to the present embodiment, the shaft 32 is the same as the shaft 12 of FIG. 2. According to an alternative embodiment, at least one stage TS1, TS2, and TS3 of the turbine section 30 is connected to a shaft that is different than the shaft 12 of FIG. 2. For example, according to one embodiment, the buckets 33 of the stages TS1 and TS2 are connected to the shaft 12 of FIG. 2, and the buckets 33 of the stage TS3 are connected to a separate shaft 32.

The turbine section 30 includes nozzles 34 to direct the air onto the buckets 33 at predetermined angles. The nozzles 34 are comprised of stationary vanes, or airfoils, 35, an inner airfoil support 36, and the casing 37. According to alternative embodiments, an outer airfoil support is provided and attached to the casing 37. As the heated air is directed to the buckets 33 by the nozzles 34, the buckets 33 generate a rotation force on the shaft 32. One or more devices are connected to the shaft to be driven by the shaft, such as a generator to generate electrical energy.

The nozzles 34 and buckets 33 are arranged annularly about the shaft 32. Each group of an annular group of nozzles 34 and a following annular group of buckets 33 is a stage of the turbine section 30. Although three stages TS1, TS2, and TS3 are illustrated in FIG. 3A, according to alternative embodiments, the turbine section 30 includes any number of stages, including two stages, or any number greater than three stages.

Referring again to FIG. 1, the turbine 1 of the present embodiment includes a bypass circuit 50 connected between the compressor 10 and the turbine section 30. The bypass circuit 50 includes a conduit 52 to transmit compressed air from the compressor 10, a valve 51 to control the transmission of the air between the compressor 10 and the turbine section 30, and a conduit 53 to transmit the air from the valve 51 to the turbine section 30. The air that is transferred from the compressor 10 to the turbine section 30 via the bypass circuit 50 is a bypass flow F.

As illustrated in FIG. 2, according to the present embodiment, the air is removed from the compressor 10 via an outlet 16 in the sixth stage S6 of the compressor 10. According to alternative embodiments, the air is transferred from the compressor 10 at any stage, or from a plurality of stages, between the third stage S3 and the eleventh stage S11.

In addition, according to the present embodiment, when the turbine 1 is operated to drive a part load, or less than an 90% load, the air input to the compressor 10 is increased by 10 to 20% relative to a conventional part-load input, and 10 to 20% of the compressed air is transmitted from the compressor 10 to the turbine section 30 via the bypass circuit 50. For example, according to one embodiment, the air input to the compressor 10 is increased by 20% and 15% of the compressed air is transmitted from the compressor 10 to the turbine section 30 via the bypass circuit 50.

As illustrated in FIG. 3A, the bypass flow F from the bypass circuit 50, is transmitted from the conduit 53 to an inlet 39 located at the last stage TS3 of the turbine section 30. The bypass flow F is then injected directly to the buckets 33 of the last stage TS3 to increases stage pressure ratio, resulting in additional output and improved efficiency. Increased pressure ratio in the last stage corrects the diffuser inlet tangential radial flow angles closer to design point, which avoids flow separation on the strut and hub walls. Correcting the diffuser inlet flow angles improves diffuser ideal and actual pressure recovery, resulting in additional output and improved efficiency.

Figure 3B:
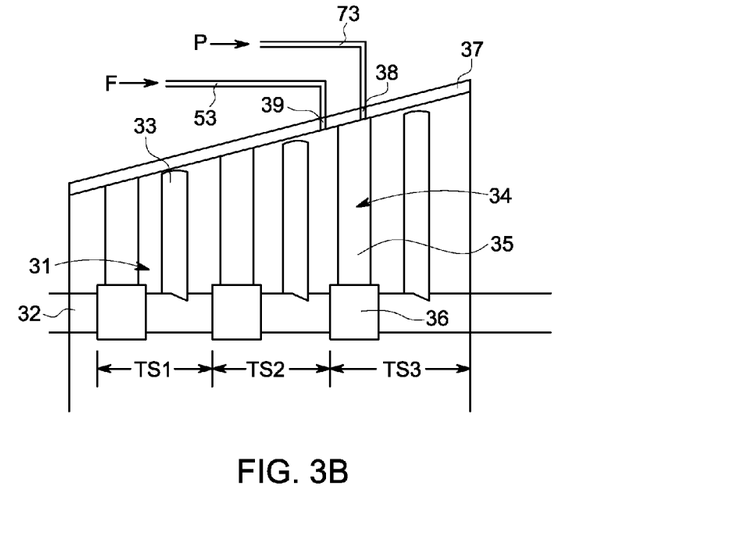
Figure 3C:
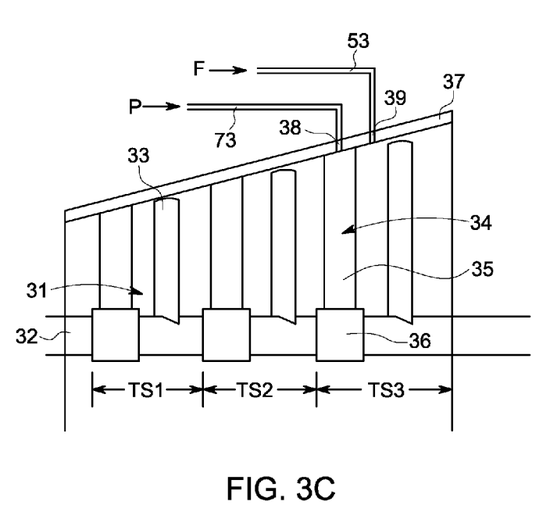

FIG. 3A illustrates an example of a turbine section 30 in which the bypass flow F is injected at a location corresponding to the airfoils 35 of the last stage TS3. However, according to alternative embodiments, the bypass flow F is injected into the turbine section 30 prior to the airfoils 35 of the last stage TS3 in the length direction Z, as illustrated in FIG. 3B, or between the airfoils 35 and buckets 33 of the last stage TS3 in the length direction Z, as illustrated in FIG. 3C. According to the present specification and claims, the terms "at the last stage" and "to the last stage" include any location between the buckets 33 of the second-to-the-last stage TS2 and the buckets 33 of the last stage TS3 in the length direction Z, as illustrated in FIGS. 3A to 3C, respectively.

Figure 4:
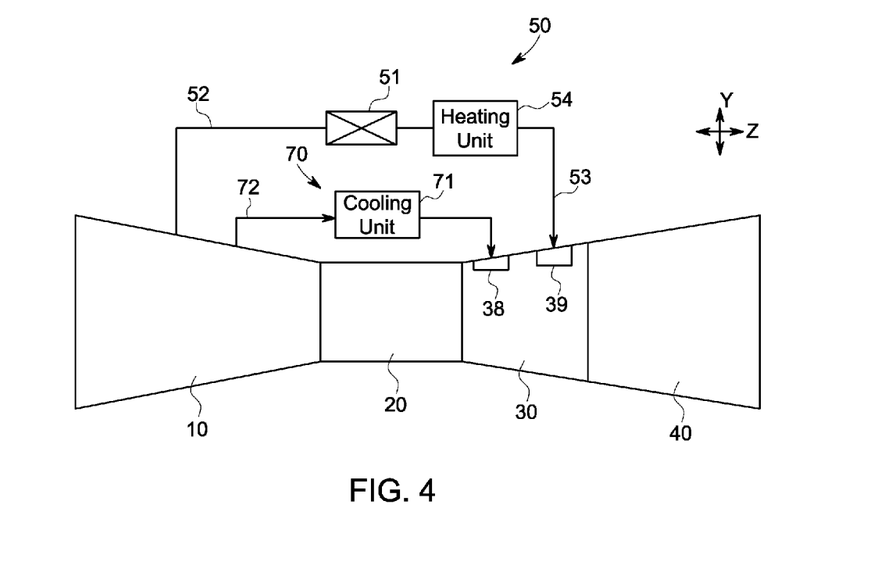
FIG. 4 illustrates a turbine according to another embodiment.

FIG. 4 illustrates an embodiment in which the turbine 1 includes a cooling circuit 70. The cooling circuit 70 includes a cooling unit 71, a conduit 72 to transmit air between the compressor 10 and the cooling unit 71, and a conduit 73 to transmit air from the cooling unit 71 to the turbine section 30. The cooling unit 71 according to the present embodiment is piping to transmit air directly from the conduit 72 to the conduit 73. Since the air from the compressor 10 is cooler than the heated air in the turbine section 30, the air from the compressor 10 cools components of the turbine section 30. According to an alternative embodiment, the cooling unit 71 includes a refrigerant or other cooling solution or structure to further cool the air from the compressor 10. In yet another embodiment, there is no conduit 72, and instead, the cooling air is supplied to the cooling unit 71 from a source external to the turbine 1.

In one embodiment, the cooling circuit 70 transmits air to only a predetermined number of first stages of the turbine section 30, but does not transmit air to a predetermined number of last stages of the turbine section 30. For example, according to one embodiment, the cooling circuit 70 transmits air to only stages TS1 and TS2, but not to TS3 of the turbine section 30.

As illustrated in FIGS. 3A and 4, the cooling circuit 70 supplies air to the turbine section 30 via an inlet 38 and the bypass circuit 50 supplies air to the turbine section via an inlet 39 separate from the inlet 38. The inlets 38 and 39 are illustrated as being at separate locations in the length direction Z, and on a same side of the turbine section 30 in the height direction Y for purposes of clarity in description. However, in alternative embodiments, the inlets 38 and 39 are located at different positions around a circumference of the turbine section 30, including adjacent to each other in the length direction Z and apart from each other in the height direction Y.

Figure 5:
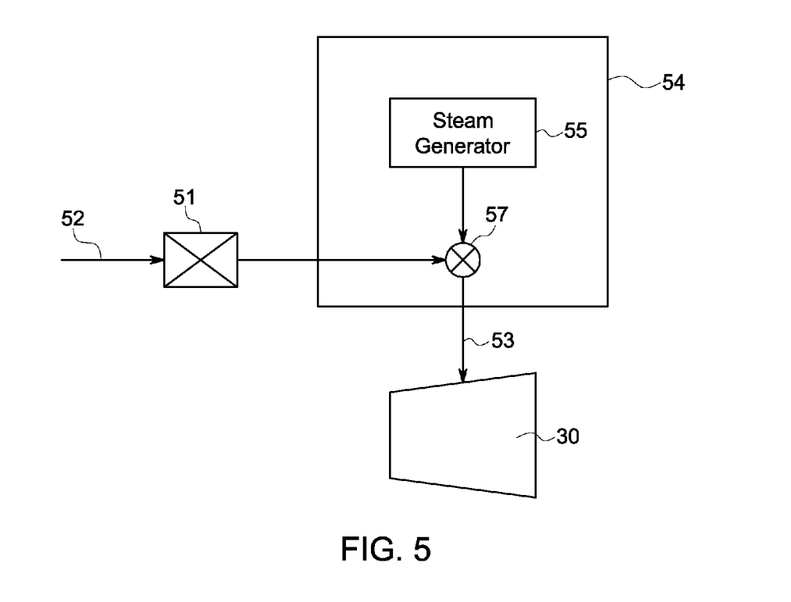
FIGS. 5 to 7 illustrate heating units of a bypass circuit according to disclose embodiments.
Figure 6:
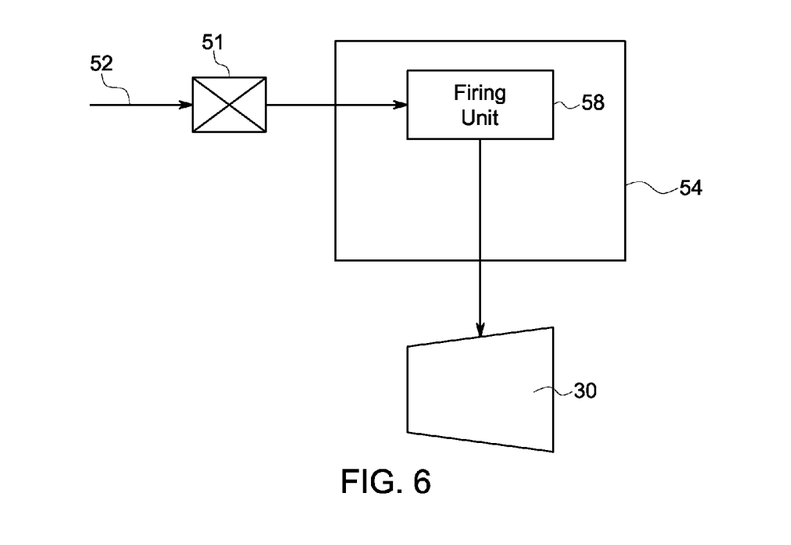
Figure 7:
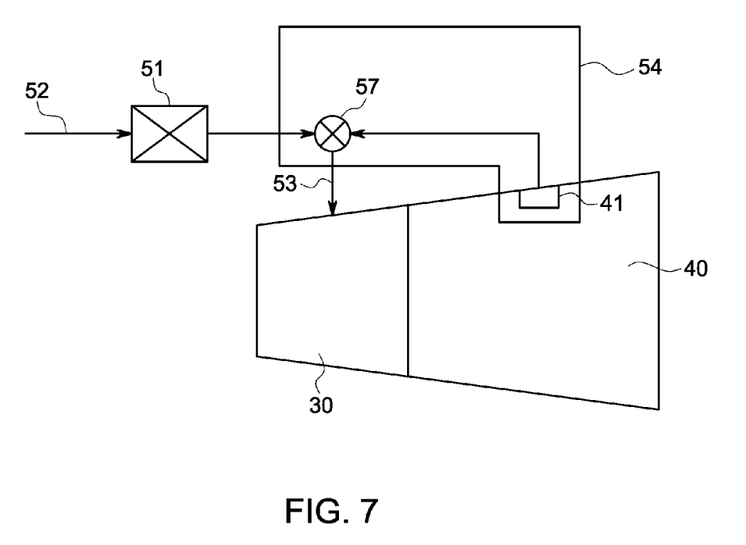

Referring to FIG. 4, the bypass circuit 50 includes a heating unit 54 to heat the bypass flow F prior to transmitting the bypass flow F to the turbine section 30. Heating the bypass flow maintains a high energy level of the air that contacts the buckets 33 of the turbine section 30 to maintain a high operating efficiency of the turbine 1. FIGS. 5 to 7 provide examples of types of heating units 54. FIG. 5 illustrates a heating unit 54 including a steam generator 55 and a junction 57. Steam from the steam generator 55 is added to the bypass flow F from the compressor 10 to heat the bypass flow F, and the bypass flow F including the steam is provided to the turbine section 30.

FIG. 6 illustrates a heating unit 54 including a firing unit 58. The bypass flow F passes through the firing unit 58 and is heated by the firing unit 58 before being transmitted to the turbine section 30. According to one embodiment, the firing unit 58 includes a combustion chamber in which fuel is ignited to heat the bypass flow F.

FIG. 7 illustrates a heating unit 54 including an outlet 41 from the exhaust section 40, a junction 57, and conduit 59 from the outlet 41 to the junction 57. The exhaust section 40 outputs heated air from the turbine 1, and the outlet 41 transmits a portion of the heated air of the exhaust section 40 to the bypass flow F to heat the bypass flow F, or combines the heated air of the exhaust section 40 with the bypass flow F, before the bypass flow is transmitted to the turbine section 30.

Figure 8:
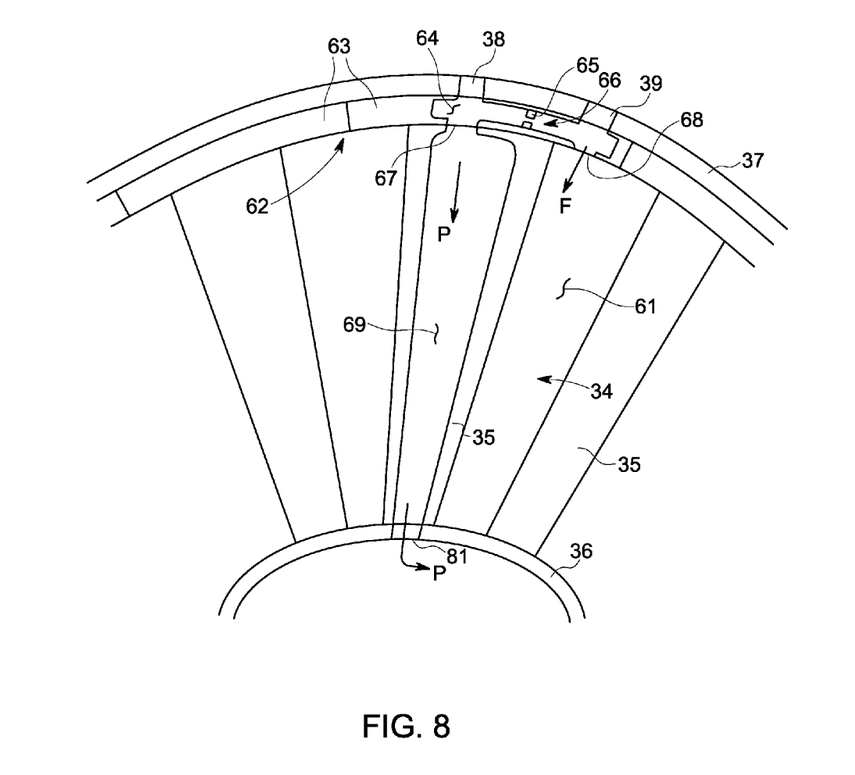
FIG. 8 illustrates a cross-section view of a turbine section nozzle according to one embodiment.

FIG. 8 illustrates a plan view of a portion of an annular group of airfoils 35 of the turbine section 30. The annular group of airfoils 35 makes up nozzles 34. In particular, each nozzle 34 comprises two adjacent airfoils 35, an inner airfoil support 36 and an outer airfoil support 62. The adjacent airfoils 35, inner airfoil support 36, and outer airfoil support 62 define a nozzle opening 61 through which air is directed to buckets 33. A size of the opening relative to the airfoils 35 is exaggerated in FIG. 8 for purposes of clarity in describing the structure of the present embodiment.

In the present embodiment, the outer airfoil support 62 comprises a plurality of segments 63. Each segment corresponds to a separate airfoil 35, and the segments 63 are connected to the casing 37 to secure the airfoils 35. According to alternative embodiments, the airfoils 35 are connected directly to the casing 37 and the structures described in the segments 63 of FIG. 8 are provided in the casing 37.

Each segment 63 includes a cavity 64 to receive the purge flow P and the bypass flow F, to transmit the purge flow P into the airfoil 35 via an inlet 67 and to transmit the bypass flow F into the cavity 64 via an inlet 68. The cavity 64 is divided into separate sections by a divider 65 which extends from upper and lower inner walls of the segment 63. The divider 65 includes an opening 66 to allow some air mixing between the bypass flow F and the purge flow P. The opening 66 has a circumference less than a circumference of the cavity 64. In other words, although some air is allowed to pass through the opening 66, since the circumference of the opening is less than that of the cavity 64, the air flow between the portion of the cavity corresponding to the purge flow P and the portion corresponding to the bypass flow F is restricted by the opening 66.

Each airfoil 35 includes a purge flow cavity 69 to receive the purge flow P, and to transmit the purge flow P to an outlet 81. The outlet 81 is at an opposite end of the airfoil 35 from the inlet 67 to allow the purge flow P to travel the length of the airfoil 35 to avoid hot gas entering into the rotor region, such as into a region corresponding to the inner airfoil support 36 and the shaft 12.

Only one segment 63 and airfoil 35 are illustrated as having a cavity 64 and purge flow cavity 69, respectively, in FIG. 8, for purposes of clarity in describing the present embodiment. However, each segment 63 and airfoil 35 of a stage includes similar features.

According to various embodiments, some stages TS1, TS2, and TS3 include the purge flow cavity 69 and others do not. For example, according to one embodiment, each stage except the last stage TS3 includes airfoils 35 having the purge flow cavity 69, but the airfoils 35 of the last stage TS3 do not include the purge flow cavity 69. In another embodiment, each stage TS1, TS2, and TS3 includes the airfoils 35 having the purge flow cavity 69.

The purge flow P is transmitted through the airfoil 35 and the bypass flow F is transmitted directly to the buckets 33 via the opening 61. In other words, according to the embodiment of FIG. 8, the bypass flow F does not enter the airfoil 35, and instead only the purge flow P enters the cavity 69 of the airfoil 35. Although it is noted that some air from the bypass circuit 50 enters the cavity 69 of the airfoil 35 via the opening 66 of the cavity 64 in the segment 63, the flow of air that makes up the majority of the bypass flow F does not pass through the opening 66. In other words, the portion of air that passes through the opening 66 into the cavity 69 is no longer considered part of the bypass flow F in the present specification and claims. According to alternative embodiments, no opening 66 exists, and instead the divider 65 entirely separates the purge flow P from the bypass flow F.

Figure 9:
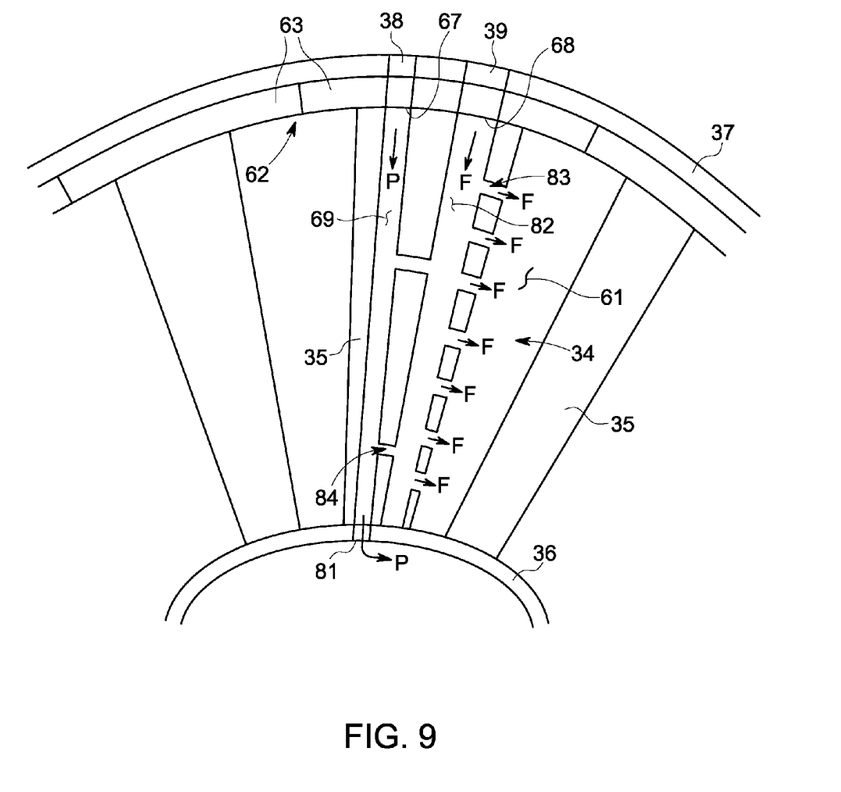
FIG. 9 illustrates a cross-section view of a turbine section nozzle according to another embodiment.
Figure 10:
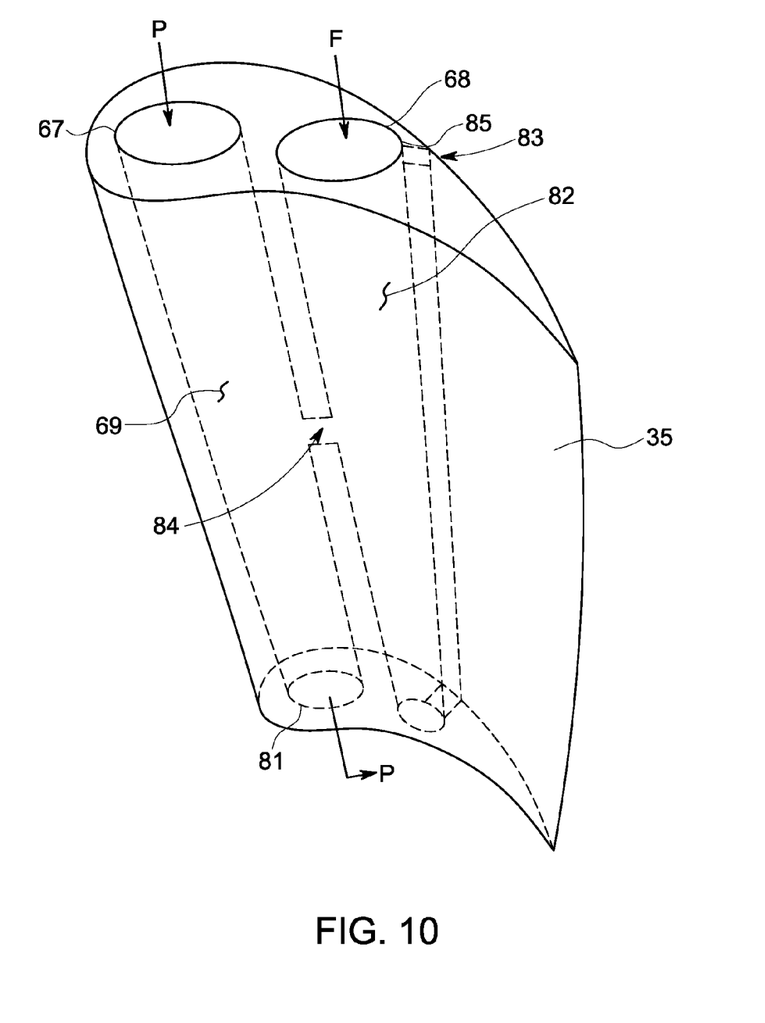
FIG. 10 illustrates an airfoil.

FIGS. 9 and 10 illustrate structures to introduce the purge flow P and bypass flow F into the turbine section 30 according to an alternative embodiment.

Referring to FIG. 9, the purge flow P passes through the inlets 38 and 67 into the purge flow cavity 69. The purge flow cavity 69 extends a length of the airfoil 35 and the purge flow P exits the airfoil 35 via an outlet 81. The bypass flow F passes through the inlets 39 and 68 into a bypass flow cavity 82. The bypass flow cavity 82 is connected to the bypass flow cavity 69 via openings 84. The bypass flow F is transmitted directly to the buckets 33 via openings 83. In other words, while each of the purge flow P and bypass flow F eventually enter the opening 61 of the nozzle 34, the purge flow P first transverses the length of the airfoil 35, while the bypass flow F enters the opening 61 via openings 83 in the airfoil 35 that face the opening 61. Consequently, the bypass flow F corrects an exit flow angle of air passing around the airfoil 35, while the purge flow P does not.

Although the openings 84 in the airfoil 35 allow some mixing of air from the bypass flow F with air from the purge flow P, the small size of the openings relative to a size of the purge flow cavity 69 and the bypass flow cavity 82 results in only a small mixing of air. Consequently, the purge flow P and the bypass flow F remain separate in the purge flow cavity 69 and bypass flow cavity 82. According to alternative embodiments, no opening 84 exists, and the purge flow cavity 69 and the bypass flow cavity 82 are entirely separated within the airfoil 35.

FIG. 10 illustrates an airfoil 35 according to an embodiment of the present invention. The airfoil 35 is similar to that of FIG. 9, except the opening 83 extends the length of the airfoil 35. In other words, while FIG. 9 illustrates a plurality of openings 83 running the length of the airfoil 35, FIG. 10 illustrates one opening 83 extending the length of the airfoil 35. A rim 85 of the airfoil 35 defines the opening 83 and directs the bypass flow F in a predetermined direction to correct a pressure ratio and exit flow angle of the air passing around the airfoil 35 towards the buckets 33.

Figure 11:
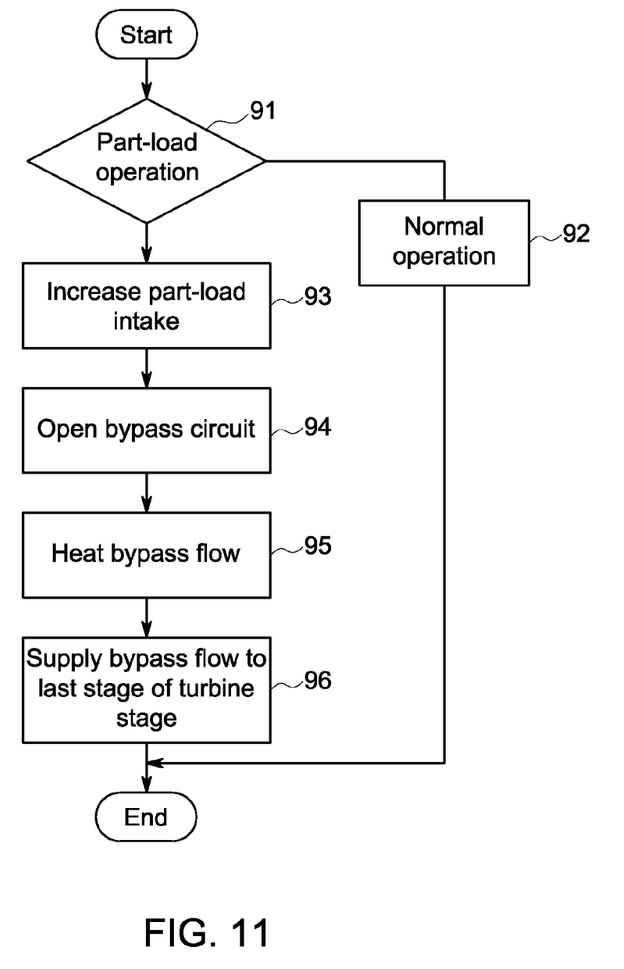
FIG. 11 is a flow diagram of a method of controlling a bypass circuit.

FIG. 11 illustrates a method of controlling the turbine 1 during a part-load operation.

In operation 91, it is determined whether the turbine 1 is to run under a part-load. According to the present embodiment, a part-load is defined as a load less than 90% of the normal output of the turbine. In other words, the turbine 1 is designed to operate at a predetermined load, which is defined as a peak load or a base load. When the turbine 1 is controlled to run at a load less than 90% of the base load, then according to the present specification and claims, the turbine 1 runs at a part-load. According to alternative embodiments, a part load is less than 60% of the base load, or less than 50% of the base load, respectively.

When it is determined that the turbine 1 is controlled to operate normally, or at the base load, the normal operation settings are implemented in operation 92. In other words, the air intake is set at 100%, the combustion level is set at 100%, and the valve 51 to cause the bypass flow to bypass the combustion chamber 20 is closed.

On the other hand, when it is determined in operation 91 that the turbine 1 is controlled to operation under a part-load, the method proceeds to operation 93. In operation 93, a predetermined part-load intake level is determined, and the predetermined intake level is increased by 20%. In alternative embodiments, the intake level is increased by a level in the range from 15% to 25%.

In operation 94, the valve 51 is opened, allowing the bypass flow F to bypass the combustion chamber 20 and to flow to the turbine section 30. In the present embodiment, 15% of the intake air is turned into the bypass flow F and transmitted via the bypass circuit 50 to the turbine section 30. However, in alternative embodiments, the percentage of intake air that bypasses the combustion chamber 20 via the bypass circuit 50 is a percentage in the range from 10% to 20%, depending on the turbine load.

In operation 95, the bypass flow F is heated, and in operation 96, the heated bypass flow F is supplied to the turbine section 30. According to the present embodiment, the bypass flow F is supplied to the last stage of the turbine section 30.

According to the above described embodiments, a bypass flow F of air is generated in a turbine 1 operating at part-load. The bypass flow F is heated and injected into the turbine section 30 to correct the stage pressure ratio and exit flow angle of air in the turbine section 30 to improve efficiency of the turbine 1 during part-load operation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbine to operate at part-load, comprising:
a compressor to intake a fluid;
a combustion chamber to heat the fluid from the compressor;
a turbine section to rotate a shaft with the heated fluid from the combustion chamber, the turbine section comprising a plurality of nozzles and each nozzle having a nozzle opening defined by first and second airfoils, an inner airfoil support and an outer airfoil support, wherein a cavity extends between the outer and inner airfoil supports and circumferentially spans respective portions of the at least one of the first and second airfoils and the adjacent nozzle;
a bypass circuit to generate a bypass flow by removing a portion of the fluid from the compressor and transmitting the portion of the fluid to the turbine section; and
a controller to determine whether a part-load operation is selected, and to open the bypass circuit when the part-load operation is selected,
wherein when the controller determines that the part-load operation is selected, the controller determines a normal part-load fluid intake to the compressor, increases the part-load fluid intake to the compressor by a predetermined first percentage above the normal part-load fluid intake, and controls the bypass circuit to remove the portion of the fluid from the compressor such that a percentage of the portion of the fluid removed from the compressor relative to the increased part-load fluid intake is less than or equal to the predetermined first percentage.

2. The turbine of claim 1, wherein the compressor includes a fluid intake device, and the controller controls the fluid intake device to increase the part-load fluid intake.

3. The turbine of claim 1, wherein the controller increases the part-load fluid intake by 20% and controls the bypass circuit to remove 15% of the fluid from the compressor.

4. A turbine, comprising:
a compressor to intake a fluid and to compress the fluid;
a combustion chamber to heat the fluid from the compressor;
a turbine section to rotate a shaft with the heated fluid from the combustion chamber, the turbine section comprising a plurality of nozzles and each nozzle having a nozzle opening defined by first and second airfoils, an inner airfoil support and an outer airfoil support; and
a bypass circuit to generate a bypass flow by removing a portion of the fluid from the compressor, to heat the bypass flow, and to insert the bypass flow to the turbine section,
a cavity extends between the outer and inner airfoil supports and circumferentially spans respective portions of the at least one of the first and second airfoils and the adjacent nozzle.

5. The turbine of claim 4, wherein the bypass circuit includes at least one of a steam generator and a firing unit to heat the bypass flow.

6. The turbine of claim 4, wherein the turbine further includes an exhaust section, and
the bypass circuit heats the bypass flow with a heated fluid from the exhaust section.

7. The turbine of claim 4, wherein the compressor includes at least eleven stages, and the bypass circuit removes the portion of the fluid from at least one of a third stage through an eleventh stage from among the at least eleven stages, where the at least eleven stages are numbered in order from an intake end of the compressor to a combustion chamber end of the compressor.

8. The turbine of claim 4, wherein the turbine section includes at least three stages numbered in ascending order from a combustion end of the turbine section to an output end of the turbine section, the at least three stages including a last stage adjacent to the output end of the turbine section, and
the bypass circuit inserts the bypass flow to the last stage of the turbine section.

9. The turbine of claim 8, wherein each stage of the turbine section includes one of the plurality of nozzles to direct the heated fluid to buckets
and the bypass circuit inserts the bypass flow through the outer airfoil support into the nozzle opening.

10. The turbine of claim 4, further comprising a cooling circuit to provide a purge flow to the turbine section,
wherein a casing of the turbine section includes a purge flow inlet to receive the purge flow and a separate bypass flow inlet to receive the bypass flow.

11. A turbine, comprising:
a compressor to intake a fluid and to compress the fluid;
a combustion chamber to heat the fluid from the compressor;
a turbine section to rotate a shaft with the heated fluid from the combustion chamber;
a bypass circuit to generate a bypass flow by removing a portion of the fluid from the compressor, to heat the bypass flow, and to insert the bypass flow to the turbine section; and
a cooling circuit to provide a purge flow to the turbine section,
wherein a casing of the turbine section includes a purge flow inlet to receive the purge flow and a separate bypass flow inlet to receive the bypass flow,
the turbine section includes a plurality of nozzles, each nozzle having a nozzle opening defined by first and second airfoils, an inner airfoil support, and an outer airfoil support, the cooling circuit inputs the purge flow into at least one of the first and second airfoils of at least one of the plurality of nozzles, and the bypass circuit inserts the bypass flow into the nozzle opening of the at least one of the plurality of nozzles.

12. The turbine of claim 11, wherein the at least one of the first and second airfoils includes a cavity extending between the outer airfoil support and the inner airfoil support, and the purge flow inlet is connected to the cavity, and the outer airfoil support of the at least one of the plurality of nozzles includes an outlet to receive the bypass flow from the bypass flow inlet and to insert the bypass flow into the nozzle opening.

13. The turbine of claim 11, wherein the outer airfoil support includes a cavity having a divider to divide the cavity into two sections, and the purge flow inlet opens into one of the two sections and the bypass flow inlet opens into the other of the two sections.

14. The turbine of claim 13, wherein the divider includes an opening connecting the two sections.

15. The turbine of claim 10, wherein the turbine section includes a plurality of nozzles, each nozzle having a nozzle opening defined by first and second airfoils, an inner airfoil support, and an outer airfoil support, the cooling circuit inputs the purge flow into a purge flow cavity of the first airfoil, and the bypass circuit inserts the bypass flow into a bypass flow cavity of the first airfoil.

16. The turbine of claim 15, wherein the first airfoil includes an opening to connect the bypass flow cavity to the nozzle opening.

17. A turbine section of a turbine, comprising:

a casing;

a rotor including a shaft and buckets extending radially from the shaft; and nozzles comprising a plurality of airfoils positioned between an outer airfoil support connected to the casing and an inner airfoil support adjacent to the shaft of the rotor to define a nozzle opening, each nozzle having a nozzle opening defined by first and second airfoils, an inner airfoil support and an outer airfoil support and a cavity extends between the outer and inner airfoil supports and circumferentially spans respective portions of the at least one of the first and second airfoils and the adjacent nozzle, wherein the casing includes a first inlet to receive a purge flow to cool at least the plurality of airfoils and a second inlet to receive a bypass flow to supply the bypass flow to the buckets of the rotor.

18. The turbine section of claim 17, wherein the turbine section includes a plurality of stages, each stage comprising an annular group of the nozzles and an adjacent annular group of the buckets, and the second inlet is located at a last stage of the plurality of stages.

19. A turbine section of a turbine, comprising:

a casing;

a rotor including a shaft and buckets extending radially from the shaft; and nozzles comprising a plurality of airfoils positioned between an outer airfoil support connected to the casing and an inner airfoil support adjacent to the shaft of the rotor to define a nozzle opening, wherein the casing includes a first inlet to receive a purge flow to cool at least the plurality of airfoils and a second inlet to receive a bypass flow to supply the bypass flow to the buckets of the rotor, at least one of the plurality of airfoils includes a purge flow cavity and a bypass flow cavity, the purge flow cavity having an inlet at one end and an outlet at an opposing end, the bypass flow cavity having an inlet at the one end and an outlet along a side of the at least one of the plurality of airfoils to transmit the bypass flow to the nozzle opening, and the first inlet of the casing is connected to the inlet of the purge flow cavity and the second inlet of the casing is connected to the inlet of the bypass flow cavity.

20. The turbine section of claim 19, wherein the at least one of the plurality of airfoils includes at least one opening between the purge flow cavity and the bypass flow cavity.

* * * * *